United States Patent
Ho

(12) 
(10) Patent No.: US 6,172,358 B1
(45) Date of Patent: Jan. 9, 2001

(54) MULTIFUNCTION INPUT MODULE

(75) Inventor: Hsin-Yin Ho, Taipei (TW)

(73) Assignee: Dexin Corporation, Taipei Hsien (TW)

( * ) Notice: Under 35 U.S.C. 154(b), the term of this patent shall be extended for 0 days.

This patent is subject to a terminal disclaimer.

(21) Appl. No.: 09/126,399

(22) Filed: Jul. 30, 1998

(51) Int. Cl.⁷ ................................ G09G 5/08; G01D 5/34
(52) U.S. Cl. ...................... 250/231.13; 250/232; 345/165
(58) Field of Search ........................ 250/231.13, 231.14, 250/231.16, 231.17, 231.18, 221, 232, 239; 356/303, 375; 345/163, 165, 166

(56) References Cited

U.S. PATENT DOCUMENTS 5,171,978 * 12/1992 Mimlitch et al. ............... 250/231.14
6,014,130 * 1/2000 Yung-Chou .................... 250/231.15

* cited by examiner

Primary Examiner—Seungsook Ham
Assistant Examiner—Kevin Pyo
(74) Attorney, Agent, or Firm—Rosenberg, Klein & Lee

(57) ABSTRACT

Disclose is a multifunction input module comprising a clamping stage, an optical chopper, a light source, and a photo detector. The clamping stage has a pivoting rack with two axial holes which can support the shaft of the optical chopper. The clamping stage has two clamping grooves outside the optical chopper to accommodate the light source and the photo detector. The clamping stage further has a plurality of clamping hooks on the bottom thereof which can be inserted into holes on a circuit board such that the optical chopper, light source, and photo detector can be easily and firmly arranged on the circuit board.

5 Claims, 5 Drawing Sheets

MULTIFUNCTION INPUT MODULE

FIELD OF THE INVENTION

The present invention relates to a multifunction input module, more particularly, to a multifunction input module which can be easily assembled on a circuit board and functions as a third input means for a computer mouse.

BACKGROUND OF THE INVENTION

The conventional third input means of a computer mouse generally provides page-up and page-down functions. The third input means generally comprises a grating wheel, a light source, and a photo-receiver arranged on a circuit board placed outside the grating wheel. The signal received by the photo-receiver will be influenced by the rotating grating wheel and then trigger an internal circuit controlling the mouse's page-up and page-down functions.

However, in the above arrangement, the accuracy of the signal for page-down or page-up functions is sensitive to the relative positions of the grating wheel, light source and receiver. The third input means of the mouse will malfunction if those optical elements are not carefully set up.

Moreover, those optical elements are soldered to the circuit board, thus causing manufacturing problems and higher costs.

The present invention provides a reliable multifunction input module having a clamping stage, a clamping groove on the clamping stage to clamp a light source and photo-receiver, and a rack for pivotally arranging an optical chopper. By the inventive module, the chopper, light source, and photo-detector can be easily and firmly assembled to the circuit board with the help of the clamping stage and the clamping hooks formed on the clamping stage.

The various objects and advantages of the present invention will be more readily understood from the following detailed description when read in conjunction with the appended Drawings, in which:

DETAILED DESCRIPTION OF THE PREFERRED EMBODIMENT

Figure 1:
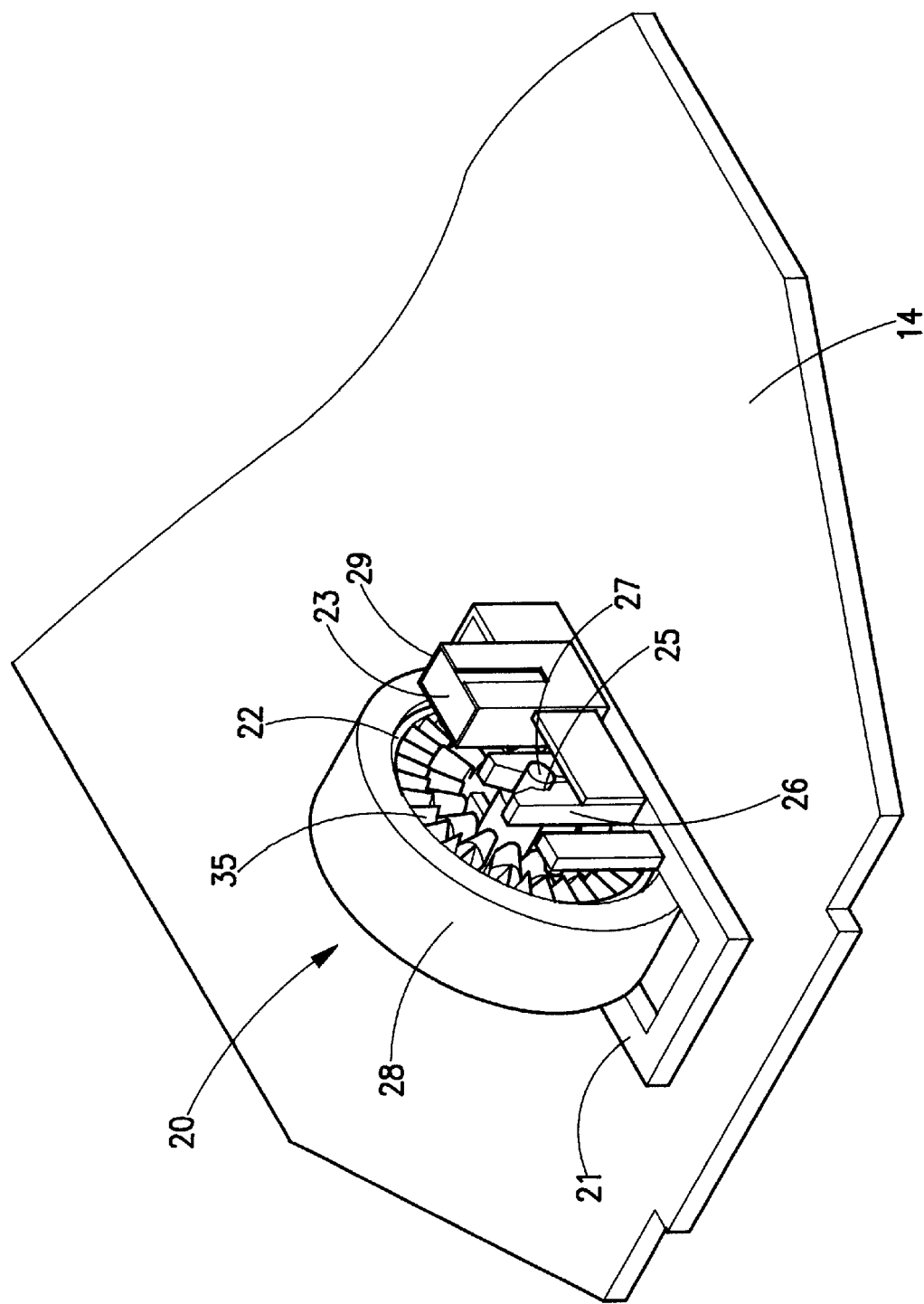
FIG. 1 is a perspective view of the preferred embodiment of the present invention.
Figure 2:
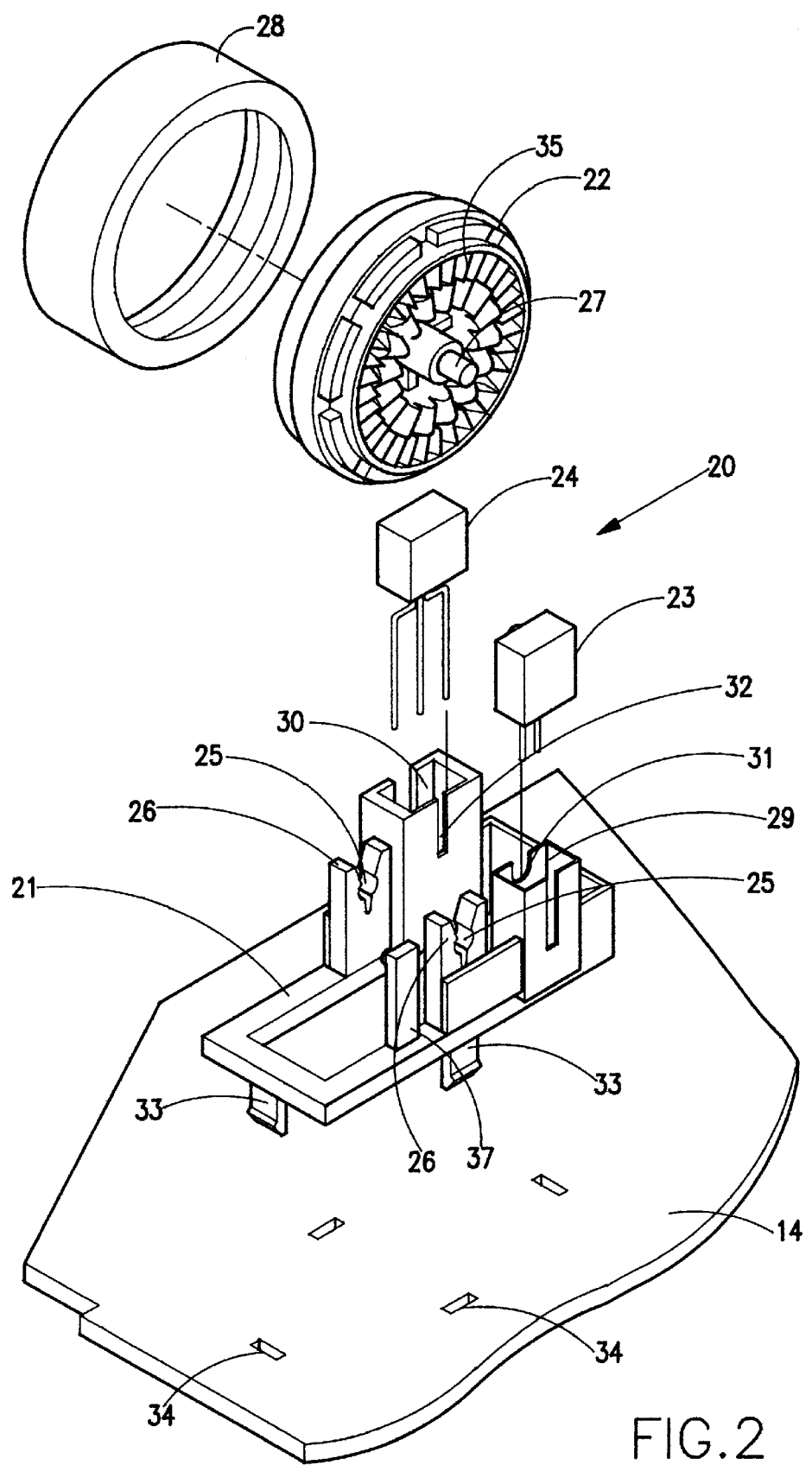
FIG. 2 is an exploded view of the preferred embodiment of the present invention.
Figure 5:
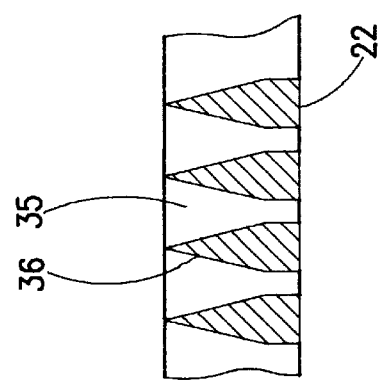
FIG. 5 is a cross-sectional view along Line B—B in FIG. 3.
Figure 4:
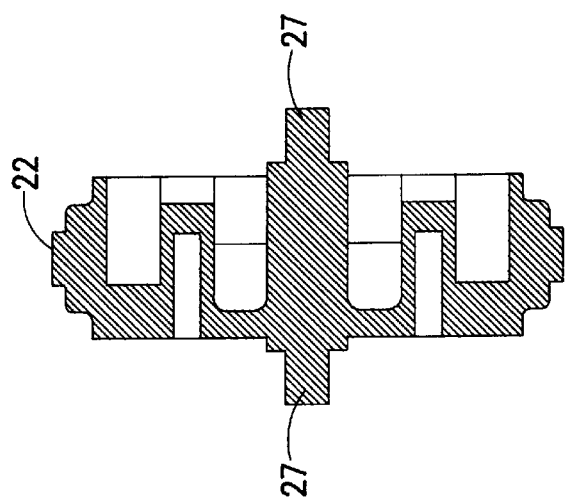
FIG. 4 is a cross-sectional view along Line A—A in FIG. 3.
Figure 3:
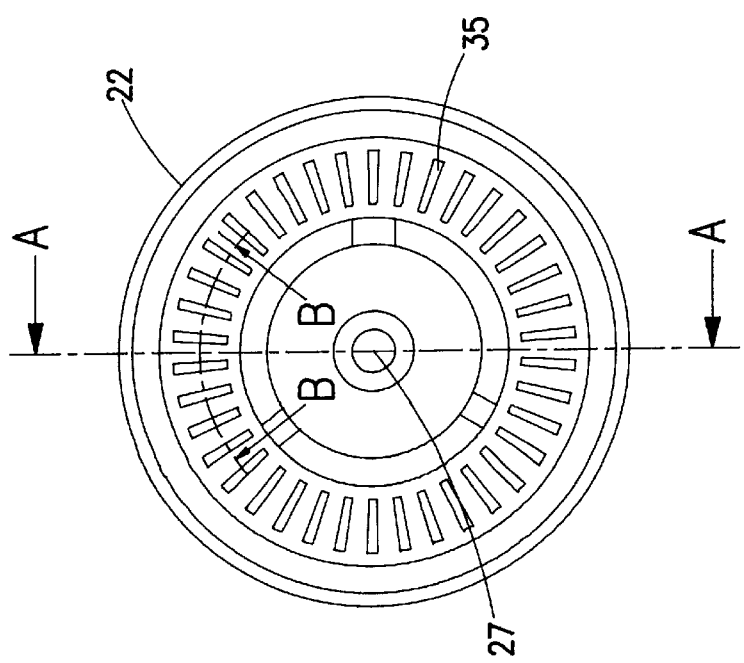
FIG. 3 is a top view of the optical chopper in the preferred embodiment of the present invention.
Figure 6:
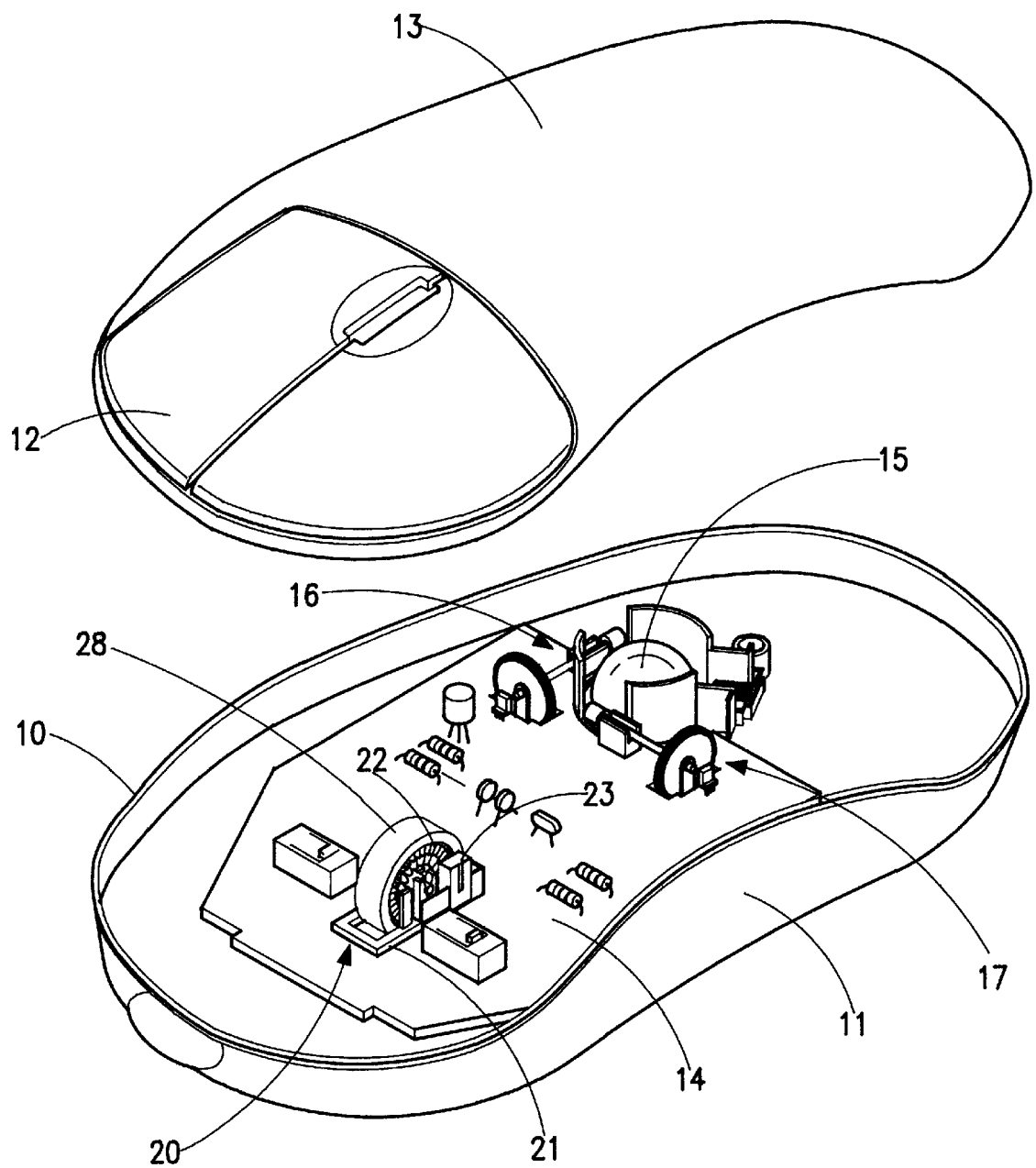
FIG. 6 is a perspective view showing the application of the preferred embodiment of the present invention to a mouse; and, FIG. 7 is another perspective view showing the application of the preferred embodiment of the present invention to a mouse.
Figure 7:
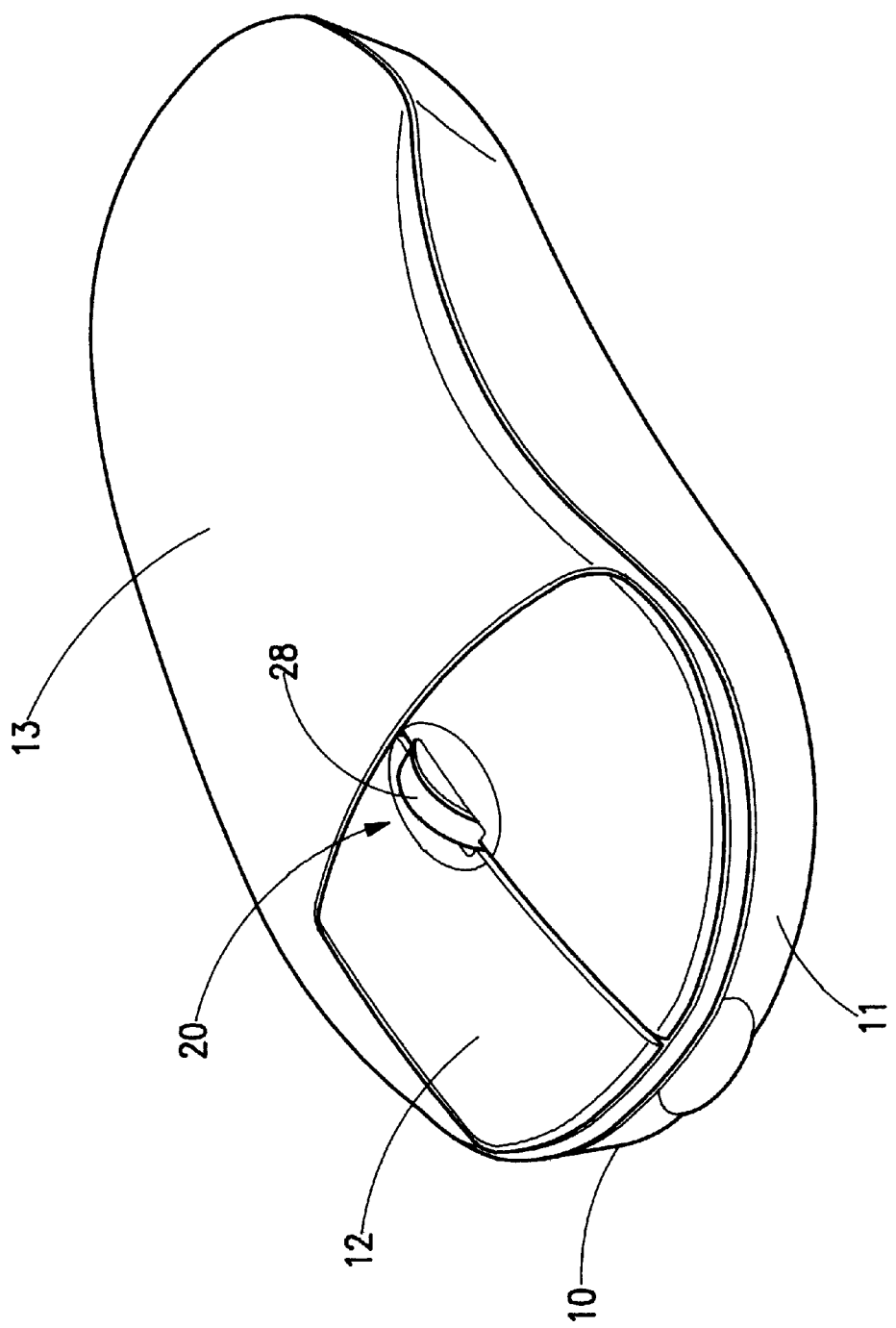

FIGS. 1–3 show the preferred embodiment of the input module according to the present invention. The inventive module 20 can be used not only for a computer mouse, keyboard or notebook computer as a third input means, but also for electronic equipment to replace a standard operation button. As shown in FIGS. 6 and 7, the inventive input module is arranged on a mouse 10. The mouse 10 comprises a base body 11 and a lid 13 having a plurality of pressing buttons 12. A circuit board 14 is placed within base body 11. A ball 15 is arranged on the bottom of base body 11. Two encoders 16, 17 are placed beside ball 15 to control vertical and horizontal movement, respectively. The mouse 10 is well-known in the art and further description is not necessary.

The present invention is intended to provide an improved input module. The inventive input module 20 comprises a clamping stage 21, an optical chopper 22, a light source 23, and a photo-detector 24. The clamping stage 21 is provided with a pivoting rack 26 having two axial holes 25. The axial holes 25 can support shaft 27 of optical chopper 22. A resilient bar 37 is used to control slits 35 to output a desired signal. The slits 35 are arranged with constant pitch on optical chopper 22 to allow transmission of light from light source 23. Suitable inclined planes 36 are provided within slit 35 to focus the incoming light.

Moreover, a handle portion 28 made of a rubber material is formed on the perimeter of optical chopper 22 to facilitate rotation of the optical chopper 22 by a user. Two clamping grooves 29, 30 are provided on clamping stage 21 and positioned away from the optical chopper 22 such that the light source 23 and the photo-detector 24 can be placed within the clamping grooves 29 and 30. Moreover, openings 31 and 32 are arranged on the side walls of the clamping grooves 29 and 30 to allow the photo-detector 24 to receive light from light source 23.

The bottom surface of the clamping stage 21 is provided with a plurality of clamping hooks 33 such that clamping stage 21 can be arranged on circuit board 14 by simply clamping the clamping hooks 33 into the corresponding clamping holes 34 on circuit board 14. By this arrangement, the optical chopper 22 along with the light source 23 and photo-detector 24 can be easily and firmly arranged on circuit board 14 of mouse 10.

When the inventive input module is used in a mouse, as shown in FIGS. 6 and 7, the optical chopper 22 can be operated by a user to send forward or backward signals. Circuit board 14 executes corresponding functions according to the detection results of photo-detector 24.

In summary, the optical chopper, the light source and the photo-detector can be easily and firmly arranged on the circuit board of the mouse or other electronic devices according to the arrangement of the present invention. Therefore, it is convenient for a user and industrially advantageous.

Although the present invention has been described with reference to the preferred embodiment thereof, it will be understood that the invention is not limited to the details thereof. Various substitutions and modifications have been suggested in the previous description and others will occur to those having ordinary skill in the art. Therefore, all such substitutions and modifications are intended to be embraced within the scope of the invention as defined in the appended claims.

What is claimed is:

1. An optical input device comprising:

a clamping stage having a pair of shaft retaining members projecting therefrom, said shaft retaining members being spaced apart from one another and each of said shaft retaining members having an axial hole formed therethrough, said clamping stage having a photo-detector retaining member projecting therefrom, said photo-detector retaining member having a photo-detector recess formed therein, said clamping stage having a light source retaining member projecting therefrom, said light source retaining member having a light source recess formed therein, said clamping stage having a plurality of clamping hooks projecting from a lower edge thereof;

a photo-detector, said photo-detector being received within said photo-detector recess;

a light source, said light source being received within said light source recess;

a circuit board having a plurality of clamping holes formed therethrough, said plurality of clamping holes corresponding to said plurality of clamping hooks, said plurality of clamping hooks being received within said plurality of clamping holes to removably capture said clamping stage in locking engagement with said circuit board;

an optical chopper wheel having a plurality of slits formed therethrough, said optical chopper wheel having a shaft member projecting therefrom, said shaft member having first and second ends, said first and second ends of said shaft member being respectively received in said axial holes of said pair of shaft retaining members, whereby a light beam projected from said light source passes through said plurality of slits of said optical chopper wheel and is received by said photo-detector, said photo-detector producing a signal corresponding to rotation of said optical chopper wheel about said shaft, said optical chopper wheel being manually actuatable in rotative displacement by a user.

2. The optical input device as recited in claim 1, wherein said optical input device is operatively coupled to a mouse, or a keyboard, or a notebook computer or an electronic device necessitating computer input.

3. The optical input device as recited in claim 1, wherein said optical chopper includes a handle portion mounted in coupled relation to a periphery of said optical chopper wheel.

4. The optical input device as recited in claim 1, wherein said plurality of slits are formed by a plurality of inclined surfaces to focus and collimate said light beam.

5. The optical input device as recited in claim 2, including a plurality of optical input devices electrically coupled to said electronic device.

\* \* \* \* \*